United States Patent [19]
Fuchigami

[11] Patent Number: 6,092,977
[45] Date of Patent: Jul. 25, 2000

[54] ROD-SHAPED ARTICLE SUPPLYING APPARATUS

[75] Inventor: Seiji Fuchigami, Tokyo, Japan

[73] Assignee: Japan Tobacco Inc., Tokyo, Japan

[21] Appl. No.: 09/377,817

[22] Filed: Aug. 20, 1999

Related U.S. Application Data

[63] Continuation of application No. PCT/JP99/01252, Mar. 15, 1999.

[30] Foreign Application Priority Data

Jul. 22, 1998 [JP] Japan ................... 10-206907

[51] Int. Cl.⁷ .................................... B65H 3/06
[52] U.S. Cl. ................. 414/746.4; 414/798; 221/177; 221/205; 198/531
[58] Field of Search ............... 414/745.7, 745.8, 414/746.3, 746.4, 797.7, 798, 511; 198/533, 531; 221/177, 205, 277

[56] References Cited

U.S. PATENT DOCUMENTS

| | | | |
|---|---|---|---|
| 3,305,128 | 2/1967 | Dearsley | 198/533 |
| 4,063,633 | 12/1977 | Hall | 198/533 |
| 4,545,724 | 10/1985 | Klusmier | 414/746.4 |
| 4,660,712 | 4/1987 | Braidotti et al. | 414/745.1 |
| 4,928,511 | 5/1990 | Sirvet | 414/797.7 |
| 4,929,138 | 5/1990 | Breuning | 414/745.7 |
| 4,930,616 | 6/1990 | Linberg | 414/746.4 |
| 5,551,827 | 9/1996 | Menegatto | 414/746.4 |

FOREIGN PATENT DOCUMENTS

| | | |
|---|---|---|
| 39-19253Y1 | 7/1964 | Japan . |
| 43-7816Y1 | 4/1968 | Japan . |
| 49-4366 U | 1/1974 | Japan . |
| 52-20559 | 2/1977 | Japan ................... 414/797.7 |
| 59-112835 U | 7/1984 | Japan . |
| 59-159622 U | 10/1984 | Japan . |
| 63-104328 U | 7/1988 | Japan . |
| 631245 | 11/1978 | U.S.S.R. ............. 414/797.7 |
| 800068 | 9/1981 | U.S.S.R. ............. 414/798 |
| 1344577 | 10/1987 | U.S.S.R. ............. 414/745.7 |
| 1421492 | 9/1988 | U.S.S.R. ............. 414/745.7 |

*Primary Examiner*—Douglas Hess
*Attorney, Agent, or Firm*—Birch, Stewart, Kolasch & Birch, LLP

[57] ABSTRACT

A rod-shaped article supplying apparatus includes a hopper for reserving rod-shaped articles such as cigarettes and for permitting a rod-shaped article to be discharged through a lower opening thereof, and a supply cylinder formed at its outer peripheral face with a slot for receiving a rod-shaped article. The supply cylinder makes a reciprocal rotational movement between a position where the slot receives a rod-shaped article from the hopper and a position where the slot discharges the same. The supply cylinder is provided with projections disposed at a location diametrically opposite the slot and radially projecting from the outer peripheral face of the supply cylinder. When the supply cylinder is in the vicinity of the delivering position, the projections cause a movable wall or a side plate of the hopper to make an angular motion to vibrate rod-shaped articles in the hopper, whereby a shelf-forming phenomenon among rod-shaped articles or jamming in the hopper is prevented with a relatively simplified arrangement to permit a stable supply of rod-shaped articles.

8 Claims, 9 Drawing Sheets

TO MEASURING SECTION

ROD-SHAPED ARTICLE SUPPLYING APPARATUS

This is a continuation application of PCT/JP99/01252 filed Mar. 15, 1999 designating the United States for the national phase.

BACKGROUND OF THE INVENTION

1. Technical Field of the Invention

The present invention relates to an apparatus for supplying a rod-shaped article, and more particularly, to a cigarette supplying apparatus suited to supply cigarettes one by one to an automatic cigarette quality measuring apparatus.

2. Related Arts

In order to measure the weight, stiffness, length, ventilation resistance and the like of a respective cigarette with use of an automatic cigarette quality measuring apparatus, a cigarette supplying apparatus for supplying rod-shaped cigarettes, as test pieces, one by one to a measuring section of the measuring apparatus is required. A rod-shaped article supplying apparatus of this kind is known from and disclosed in Japanese provisional patent publication no. 1-132916 the arrangement of which is schematically shown in FIG. 1.

As shown in the upper part of FIG. 1, a cylinder 1 is disposed to face a supply port 3a of a hopper 3 in which cigarettes 4 are reserved. The cylinder is formed at its outer peripheral face with cigarette receiving portions 1a each of which is formed into a slot adapted to receive a single cigarette. As the cylinder 1 rotates, cigarettes 4 located near the supply port 3a are received in the receiving portions in sequence and are transferred in the direction of cylinder rotation. Finally, these cigarettes 4 fall from the cigarette receiving portions 1a and are supplied to the cigarette quality measuring apparatus.

As cigarettes 4 are transferred one, by one in this manner, cigarettes 4 stacked in the hopper 3 gradually drop to the supply port 3a due to their own weight.

However, the above-mentioned rod-shaped article supplying apparatus entails a so-called shelf-forming phenomenon in which cigarettes are lodged in the hopper at locations above the supply port.

More specifically, when a cigarette 4a is received in a cigarette receiving slot 1a, the space occupied by this cigarette becomes empty, as shown in the middle part of FIG. 1. As a consequence, cigarettes 4b, 4e and 4f located near the empty space move thereto, and cigarettes 4c, 4d, 4g, 4h and 4i located above the cigarettes 4b, 4e and 4f attempt to move downward.

During the downward movement of these cigarettes, interactions between adjacent cigarettes or between a cigarette and the inner face of the hopper 3 can produce resultant forces which cause some cigarettes to be linked together. In this case, the shelf-forming phenomenon takes place among cigarettes 4d, 4h and 4i, for instance, as shown in the lower part of FIG. 1. This causes cigarettes 4 to be lodged in the hopper 3 and prevents them from reaching the supply port 3a, resulting in a failure in cigarette supply.

In order to avoid such a cigarette supply failure, the number of cigarettes received in the hopper may be reduced. This entails a drawback in that an operation of supplying cigarettes into the hopper must be made frequently.

In cigarette manufacturing processes, a cigarette supplying apparatus is employed in which a cigarette stirring/shaking device is provided in the hopper or near the supply port so as to prevent the occurrence of a shelf-forming phenomenon or destruction of a shelf of cigarettes formed in the hopper.

For a cigarette supplying apparatus for cigarette quality measurement, the size of the support port must be reduced so as to permit cigarettes to be supplied one by one to the cigarette quality measuring apparatus. Since a space available for installation of the cigarette quality measuring apparatus is usually limited, the overall size of the cigarette supplying apparatus attached to the cigarette quality measuring apparatus is naturally restricted.

For these reasons, it is practically impossible, especially from the viewpoint of space, to provide the cigarette supplying apparatus of the cigarette quality measuring apparatus with a stirring means of a kind which is employed in cigarette manufacturing processes.

Since the shelf-forming phenomenon may take place not only at locations in the vicinity of the supply port but also at the center or upper part of the hopper, a cigarette supplying apparatus has been demanded which is capable of making a stirring action over the entire space in the hopper with use of a device which is compact in size.

SUMMARY OF THE INVENTION

An object of the present invention is to provide a rod-shaped article supplying apparatus which is capable of preventing the occurrence of a shelf-forming phenomenon among stacked rod-shaped articles and which is simple in construction.

According to the present invention, there is provided a rod-shaped article supplying apparatus which includes a hopper for reserving rod-shaped articles and for permitting the rod-shaped articles to be discharged through a lower opening of the hopper, and a supply cylinder which has an outer peripheral face having a receiving portion for receiving a rod-shaped article and which is rotatable so that the receiving portion moves along a moving path including a rod-shaped article receiving position where the receiving portion faces the lower opening of the hopper and a rod-shaped article delivering position where the rod-shaped article is discharged from the receiving portion.

The rod-shaped article supplying apparatus of the present invention comprises at least one movable wall which constitutes part of the hopper and which is arranged for an angular motion, and a driving apparatus for causing the at least one movable wall to make the angular motion.

According to the present invention, the movable wall of the hopper is driven by the driving apparatus so as to make an angular motion which provides vibrations to rod-shaped articles stacked in the hopper, whereby the occurrence of a shelf-forming phenomenon among rod-shaped articles can be prevented and the supply of rod-shaped articles to the supply cylinder can be stabilized. Even if a shelf-forming phenomenon takes place among rod-shaped articles stacked in the hopper, a shelf of cigarettes can be destroyed, so that the shelf-forming phenomenon can be effectively prevented and the rod-shaped articles can be discharged one by one from the hopper with reliability.

Preferably, the hopper has a first plate which extends obliquely toward the supply cylinder and which constitutes the at least one movable wall. The first plate is pivotably supported at its upper end portion and has a lower edge which extends in parallel to a rotation axis of the supply cylinder and which is disposed close to the outer peripheral face of the supply cylinder to constitute one side edge of the lower opening of the hopper.

With this preferred arrangement, as the first plate, i.e., the movable wall makes an angular motion, the lower edge of the first plate is swung to greatly change a stacked state of cigarettes in the vicinity of the lower opening of the hopper, to thereby positively prevent the occurrence of a shelf-forming phenomenon among rod-shaped articles near the lower opening.

In the above-mentioned preferred arrangement, preferably, the hopper has a second plate which extends obliquely toward the supply cylinder. The second plate has its lower edge which extends in parallel to the rotation axis of the supply cylinder and which is disposed close to the outer peripheral face of the supply cylinder to constitute another side edge of the lower opening of the hopper. More preferably, the hopper has third and fourth plates which extend perpendicularly to the rotation axis of the supply cylinder, and which are disposed at a distance from each other. The distance between the third and fourth plates is longer than lengths of the rod-shaped articles. More preferably, the second plate is fixed to the third and fourth plates.

According to the aforementioned more preferable arrangement, the rod-shaped articles stacked in the hopper are permitted to smoothly move toward the lower opening of the hopper along the first and second plates extending obliquely toward the supply cylinder, and in combination with the smooth article movement and the angular motion of the first plate, the rod-shaped articles can be discharged through the lower opening in a stable manner. According to the arrangement in which the first plate alone is movable with the second plate fixed to the third and fourth plates, the driving apparatus for angular motion can be simplified.

In the more preferable arrangement, preferably, the driving apparatus includes a driving system for causing the supply cylinder to make a reciprocal rotation such that the receiving portion of the supply cylinder makes a reciprocal rotational movement between the rod-shaped article receiving position and the rod-shaped article delivering position, a projection projecting radially outwardly from the outer peripheral face of the supply cylinder, the projection being provided at a location diametrically opposite the receiving portion and permitted to be engaged with and disengaged from a lower face of a lower edge portion of the first plate, and a stopper adapted to abut against the lower face of the first plate to thereby hold the first plate when the projection is out of engagement with the first plate.

According to the just-mentioned preferred arrangement, the driving system of the driving apparatus causes the supply cylinder to make a reciprocal rotational motion, so that the receiving portion of the supply cylinder rotates reciprocally between the rod-shaped article receiving position and the rod-shaped article delivering position. During the period from the time the receiving portion of the supply cylinder passes a specific position short of the delivering position to the time it returns to the specific position by way of the delivering position, the first plate, i.e., the movable wall makes an angular motion. At the delivering position, the rod-shaped article is discharged from the receiving portion of the supply cylinder. On the other hand, during the period from the time the receiving portion of the supply cylinder passes the specific position short of the delivering position to the time it returns to the specific position by way of the receiving position, the movable wall does not perform an angular motion. At the receiving position, the rod-shaped article discharged from the hopper is received in the receiving portion of the supply cylinder.

As a result, the angular motion of the movable wall is carried out without disturbing the transfer of rod-shaped articles from the hopper to the receiving portion of the supply cylinder, whereby rod-shaped articles can be smoothly and positively transferred from the hopper to the supply cylinder while positively preventing a shelf-forming phenomenon among rod-shaped articles in the hopper. In addition, the driving system of the driving apparatus has both a function of a drive source for the angular motion of the movable wall and a function of a drive source for rotating the supply cylinder in relation to the supply and discharge of the rod-shaped articles to and from the supply cylinder. This contributes to a simplified arrangement of the rod-shaped article supplying apparatus. Moreover, the projection projecting from the supply cylinder and the stopper, abutting against the hopper, of the driving apparatus can be provided within a region for the installation of the supply cylinder and the hopper. This contributes to a compact design of the rod-shaped article supplying apparatus.

In the present invention, preferably, the rod-shaped article supplying apparatus further comprises a guide shoot, disposed below the supply cylinder, for receiving the rod-shaped article discharged from the receiving portion of the supply cylinder. The guide shoot has an upper opening thereof disposed to face the receiving portion of the supply cylinder when the receiving portion moves to the rod-shaped article delivering position, a direction-turnover guide for changing a posture of the rod-shaped article, entering the guide shoot through the upper opening, from a horizontal posture to a vertical posture, and a lower opening through which the rod-shaped article having the vertical posture is discharged.

With the just-mentioned preferred arrangement, the rod-shaped article supplying apparatus is provided which is suitable for use with a measuring apparatus in which quality measurements on rod-shaped articles are carried out in a condition that a respective rod-shaped article is held in a vertical position.

In the present invention, preferably, the outer peripheral face of the supply cylinder is formed into a roughened face which increases a degree of frictional engagement between the outer peripheral face and rod-shaped articles. For instance, a number of fine grooves extending in parallel to the rotation axis of the supply cylinder are formed in the outer peripheral face of the supply cylinder. The supply cylinder is disposed such that part of the outer peripheral face is loosely fitted into the lower opening of the hopper.

With this preferred arrangement, rod-shaped articles reaching near the lower opening of the hopper are frictionally engaged with the outer peripheral face of the supply cylinder to receive a rotational force from the supply cylinder, whereby these rod-shaped articles make rolling motions to move toward the receiving portion of the supply cylinder to be reliably received in the receiving portion of the supply cylinder in sequence.

More preferably, the supply cylinder having the outer peripheral face formed into a roughened face is employed in conjunction with the hopper having a first plate extending obliquely toward the supply cylinder and constituting the at least one movable wall and a second plate extending obliquely toward the supply cylinder. The first and second plates have their lower edges extending in parallel to the rotation axis of the supply cylinder and disposed close to the outer peripheral face of the supply cylinder to constitute both side edges of the lower opening of the hopper.

With the just-mentioned preferred arrangement, rod-shaped articles which are frictionally engaged with the outer peripheral face of the supply cylinder to be provided with a rotary force therefrom are aligned in parallel to the receiving portion of the supply cylinder, whereby a failure is prevented in receiving a rod-shaped article in the receiving portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 7:
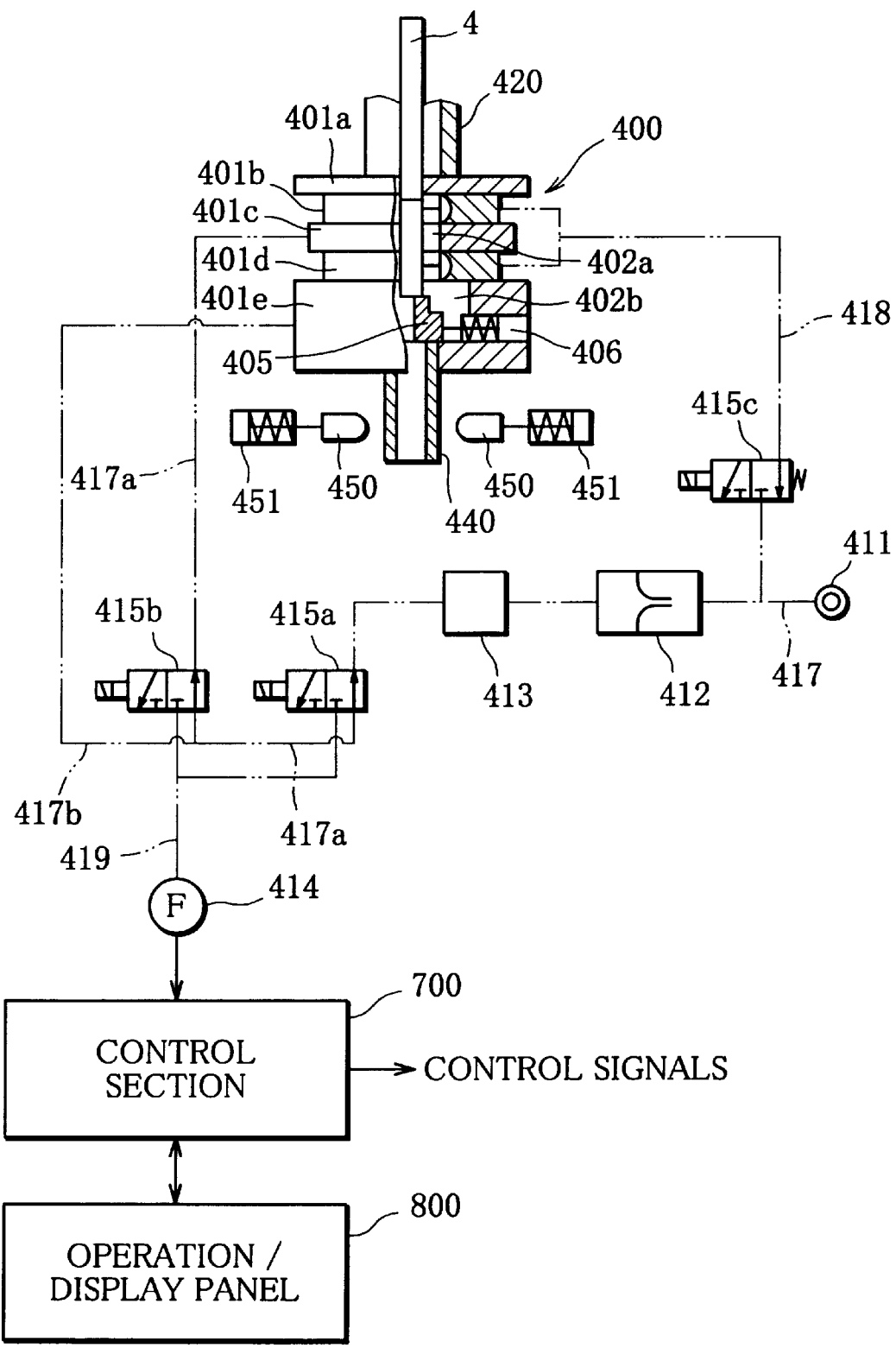
FIG. 7 is a schematic view of a ventilation-characteristic measuring section shown in FIG. 2, with a ventilation vessel shown broken away.
Figure 9:
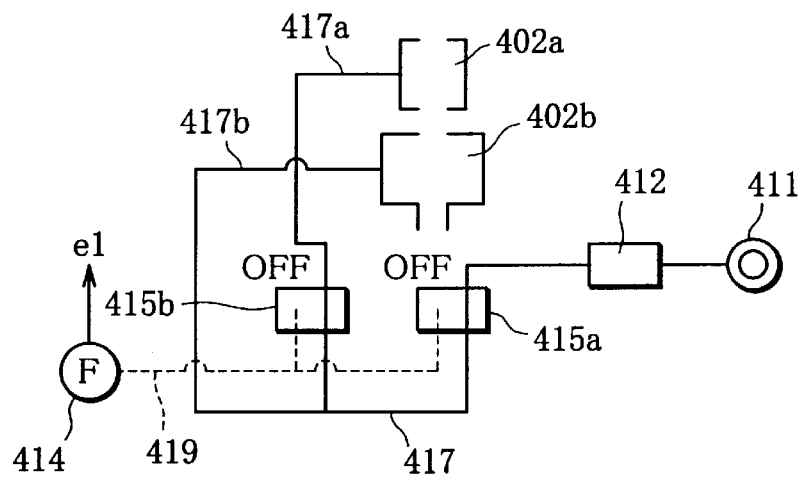
Figure 10:
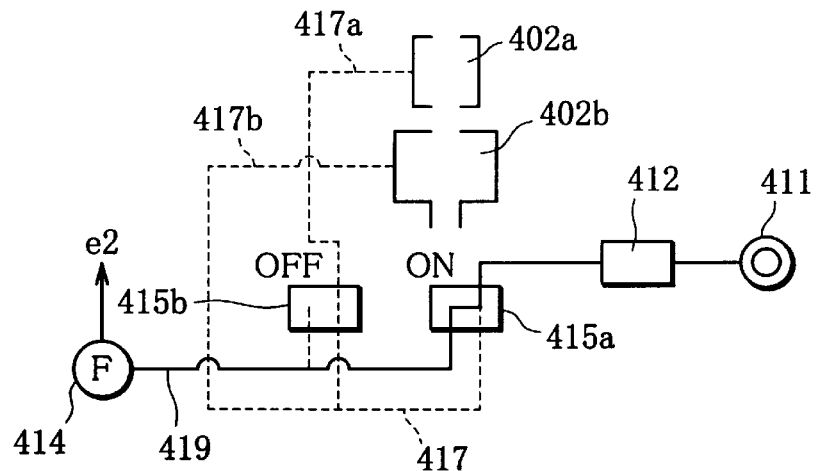
Figure 11:
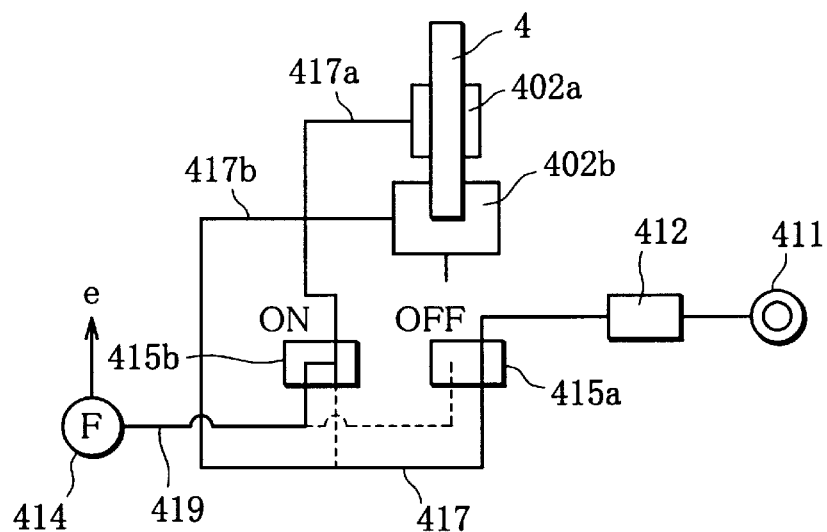
Figure 12:
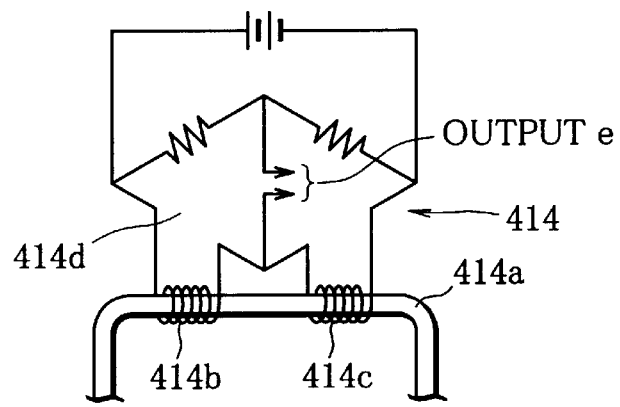
Figure 13:
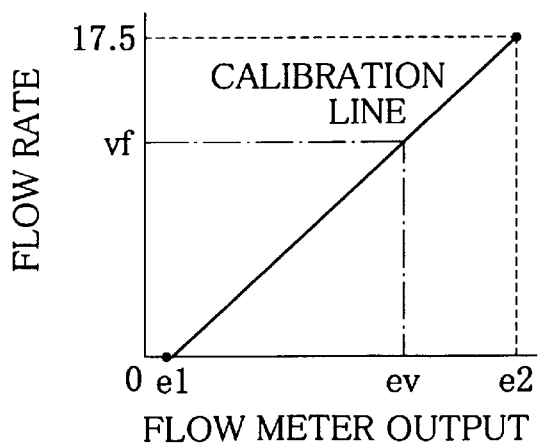

for FIG. 9 is a schematic diagram showing a pipe arrangement for reducing the flow rate of air flowing through a flow meter to zero in order to perform a calibration of a measuring characteristic line for the flow meter provided in the ventilation-characteristic measuring section shown in FIG. 7;

FIG. 10 is a schematic diagram showing a pipe arrangement for regulating the flow rate of air flowing through the flow meter to a prescribed rate in order to carry out a calibration of a measuring characteristic line for the flow meter;

FIG. 11 is a schematic diagram showing a pipe arrangement for a ventilation characteristic measurement;

FIG. 12 is a fragmentary view showing a construction of the flow meter of the ventilation-characteristic measuring section; and FIG. 13 is a view showing a measuring characteristic line of the flow meter for a ventilation characteristic measurement.

DETAILED DESCRIPTION

With reference to the appended drawings, a cigarette quality testing apparatus equipped with a cigarette supplying apparatus according to an embodiment of the present invention will be explained hereinbelow.

Whole Arrangement

Figure 1:
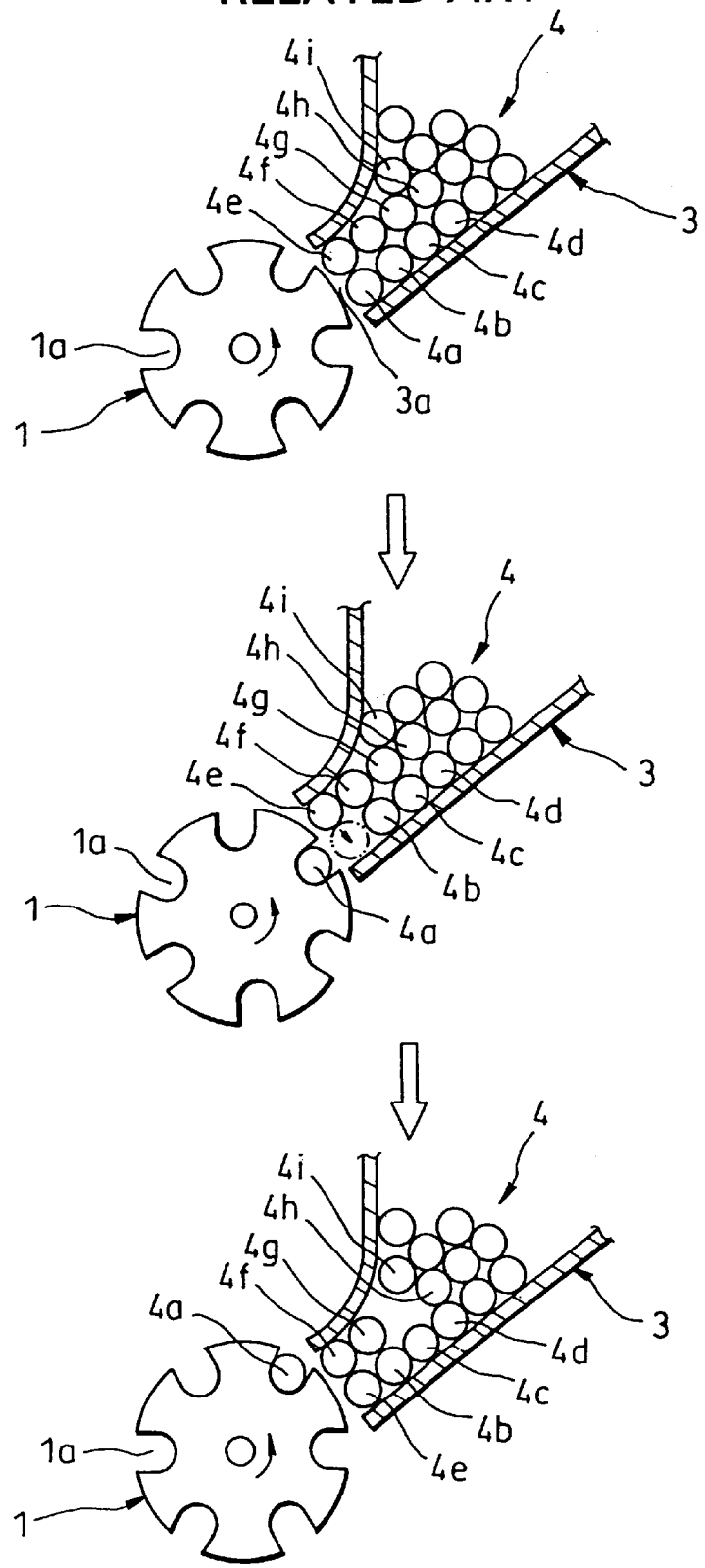
FIG. 1 is a view showing an operation of a conventional rod-shaped article supplying apparatus.
Figure 2:
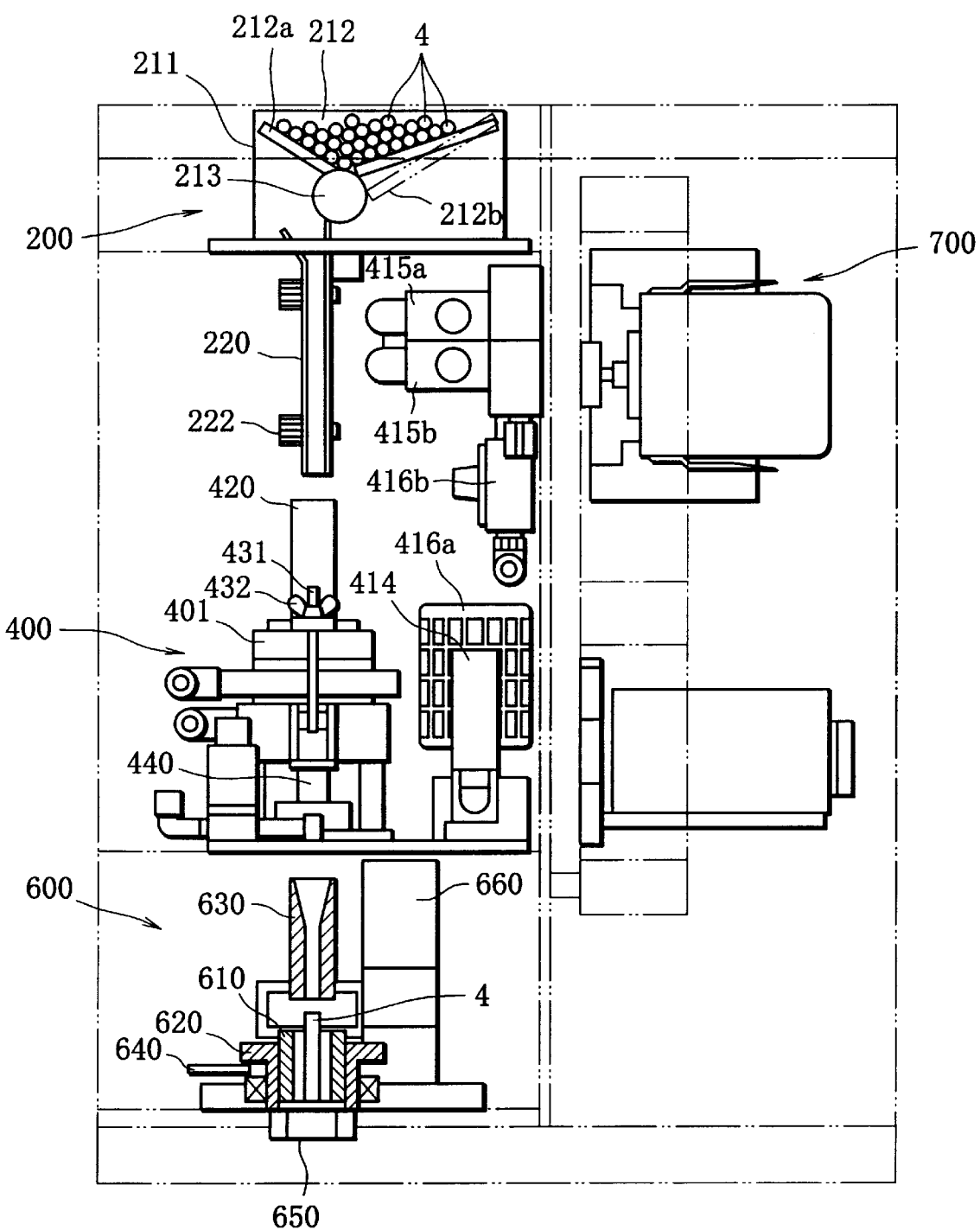
FIG. 2 is a side view showing a cigarette quality testing apparatus equipped with a cigarette supplying apparatus according to an embodiment of the present invention.
Figure 3:
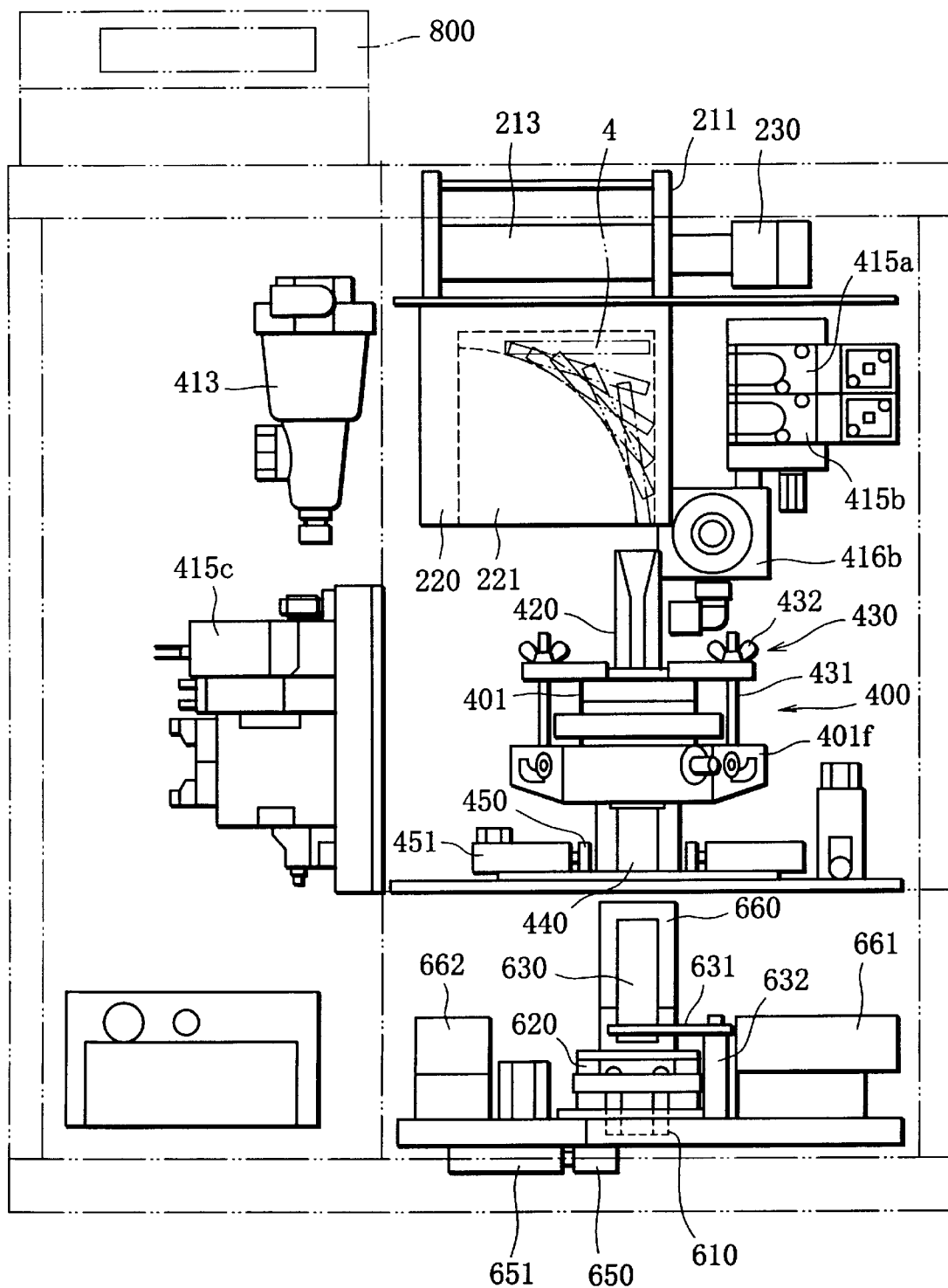
FIG. 3 is a front view of the cigarette supplying apparatus shown in FIG. 2.

As shown in FIGS. 2 and 3, the cigarette quality testing apparatus comprises a cigarette supplying apparatus 200 for receiving, at a supply cylinder 213, a cigarette (test-piece) 4 supplied from a hopper 212 and for discharging the cigarette received in the supply cylinder therefrom, while causing a side plate 212b of the hopper 212 to make an angular motion with use of a reciprocal motor 230, to thereby prevent cigarette jamming in the hopper, and a ventilation-characteristic measuring section 400 for measuring ventilation characteristics of a cigarette supplied from the cigarette supplying apparatus 200, and a circumference measuring section 600 for measuring the circumference of a cigarette transferred from the ventilation-characteristic measuring section 400.

The ventilation-characteristic measuring section 400 comprises a hollow cylindrical ventilation vessel 401 having an inner peripheral face to which two test-piece supporting devices (now shown in FIGS. 2 and 3) are mounted, a hollow lower guide 440 made of a flexible material and communicating with the interior of the ventilation vessel 401, a pair of closing members 450 disposed at the both sides of a lower part of the lower guide 440. These closing members 450 are driven by cylinders 451 to clamp the lower part of the lower guide 440 therebetween.

Cigarettes 4 reserved in the hopper 212 of the cigarette supplying apparatus 200 are received in the supply cylinder 213 one by one and are supplied from the supply cylinder 213 to a guide chute 220. In the guide chute 220, a cigarette 4 is changed in direction from a horizontal position to a vertical position while dropping along an arcuate guide face of a turnabout guide 221 and falls into the ventilation vessel 401 through an upper guide 420 of the ventilation-characteristic measuring section 400.

Two test-piece supporting devices (not shown in FIGS. 2 and 3) each having a flexible test-piece holding member formed with an axial bore are mounted to an inner peripheral face of the ventilation vessel 401 so as to be vertically spaced from each other. A cigarette falling into the ventilation vessel passes through the axial bores of the test-piece holding members in a condition that the diameters of the axial bores are enlarged by applying negative pressures to the test-piece holding members, and a distal end face of the cigarette is brought in contact with an upper face of a stopper (not shown in FIGS. 2 and 3) disposed beneath the lower test-piece holding member, whereby the cigarette is supported in position within the ventilation vessel. Further, the flexible lower guide 440 of the ventilation vessel is clamped at both sides by means of the closing members 450, so that a lower opening of the lower guide is closed. As a consequence, two airtight chambers are defined in the ventilation vessel 401. Thereafter, the lower airtight chamber is evacuated, and in this condition, the flow rate of air flowing into the cigarette through the peripheral face of a filter portion, disposed in the upper airtight chamber, of the cigarette is measured, whereby a ventilation characteristic of the cigarette is measured.

As will be described in detail, in relation to the ventilation characteristic measurement, the ventilation characteristic measuring section 400 comprises a vacuum pump 411 (FIG. 7), a critical nozzle (FIG. 7), a mist filter 413, a flow meter 414, solenoid valves 415a, 415b, 415c, and filters 416a, 416b. These elements are connected with use of pipes such as flexible tubes, not shown in FIGS. 2 and 3.

The circumference measuring section 600 comprises a cylindrical cigarette holder 610 made of a flexible material, a sleeve 620 for receiving the holder 610, and a guide member 630 disposed above the holder 610. The sleeve 620 is drivingly coupled to a motor 660 through a power transmission system, not shown. The sleeve 620 has a peripheral wall formed with a pressurized-air supply port extending through and communicating with a pressurized-air source through a flexible tube 640.

After completion of the ventilation characteristic measurement, the stopper is moved to a receding position within the ventilation vessel 401 and the closure of the lower opening of the ventilation vessel by means of the closing members 450 is released. As a consequence, the cigarette falls from the ventilation vessel 401 into the cigarette holder 610 of the circumference measuring section 600 through the cylindrical guide 630 of the measuring section 600. A lower end opening of the holder 610 is closed in advance by a shutter 650, so that the lower end face of the cigarette is brought in contact with an upper face of the shutter. Next, pressurized air is supplied between an outer peripheral face of the flexible holder 601 and an inner peripheral face of the sleeve 620 of the circumference measuring section 600. As a result, the holder 610 is reduced in diameter to thereby tightly hold the cigarette, so that the cigarette assumes a vertical position.

Then, the sleeve 620 is rotated through a predetermined angle around a longitudinal axis of the sleeve by means of the motor 660 through the power transmission system, so that the cigarette rotates around its axis. During the cigarette rotation, a laser beam having a beam width wider than the diameter of the holder 610 is projected from a transmitter 661 of a photosensor to the cigarette 4, and a receiver 662 of the photosensor generates an output voltage which varies in dependence on a quantity of light of the laser beam partly blocked by the cigarette. The output voltage of the receiver 662 is periodically detected, whereby cigarette diameters are detected at different rotational positions of the cigarette and the circumference of the cigarette is measured based on an average value of the detected cigarette diameters.

Finally, the supply of pressurized air in between the cigarette holder 610 and the sleeve 620 is stopped and the shutter 650 is driven backward by a shutter drive cylinder 651. When the shutter 650 is moved laterally to a receding position away from a location beneath the lower opening of the holder 610 in this manner, the cigarette is discharged downward from the circumference measuring section 600.

The ventilation-characteristic measuring section 400 and the circumference measuring section 600 operate under the control of a control section 700 equipped with a microprocessor and the like. The control section 700 comprises output ports for outputting control signals and input ports for inputting detection signals and pieces of detection data, and determines ventilation characteristics and the circumference of a cigarette from pieces of detection data supplied from the measuring sections 400 and 600.

In FIG. 3, reference numeral 800 denotes an operation/display panel including a printer for printing results of measurements performed by the cigarette quality testing apparatus and a liquid crystal panel for displaying an operation menu of the cigarette quality testing apparatus and for permitting an operator to make manual settings on the menu in respect of various items for the operations of the testing apparatus.

Cigarette Supplying Apparatus

Figure 4:
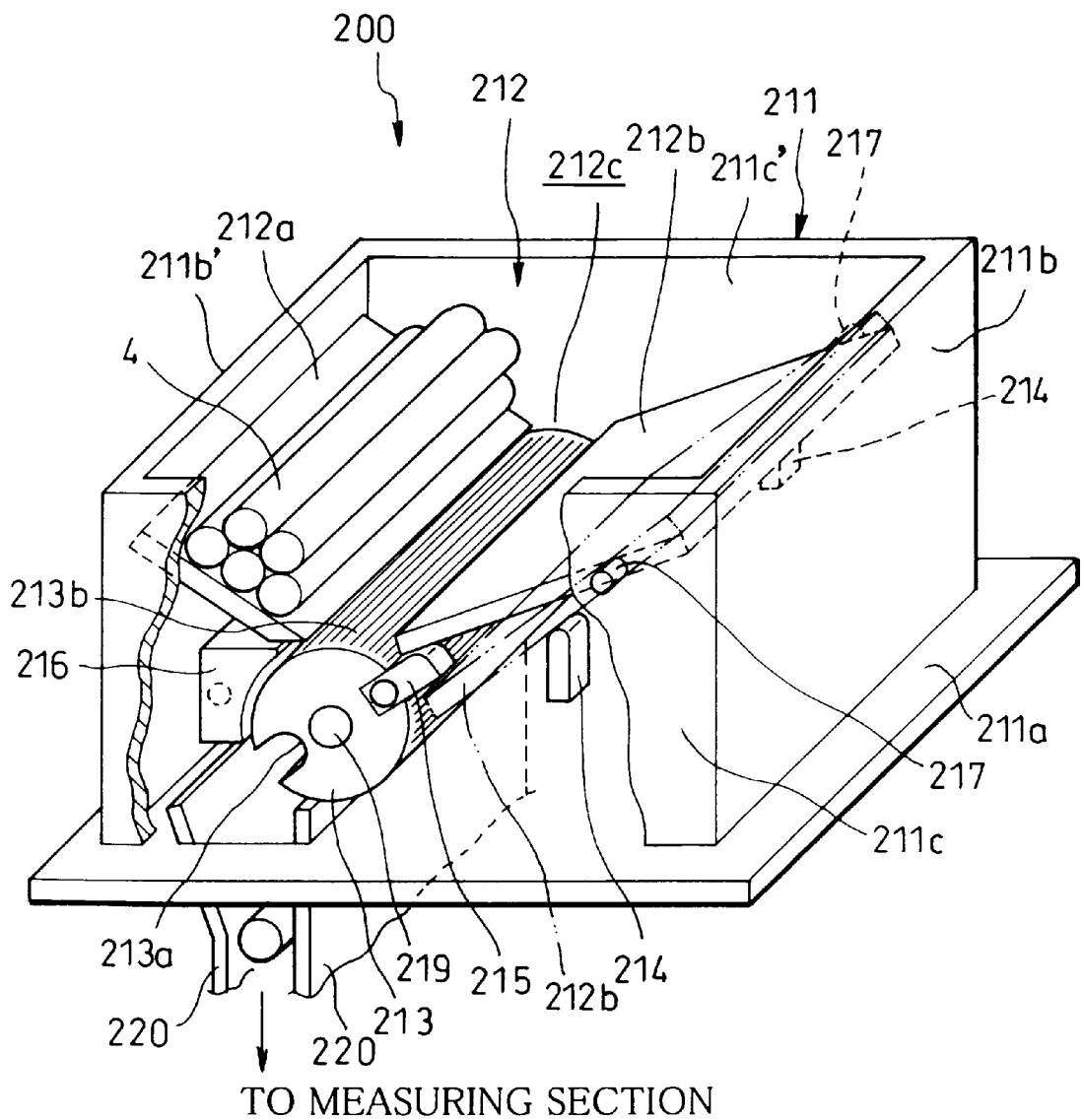
FIG. 4 is a perspective view showing, partly broken away, the cigarette supplying apparatus shown in FIG. 2.

Referring to FIG. 4, a cigarette supplying apparatus 200 is comprised of a housing 211, a hopper 212 for reserving a number of cigarettes 4, a supply cylinder 213 for receiving cigarettes 4 one by one from the hopper 212 and for discharging the received cigarette to a guide chute 220, and a driving apparatus for causing a movable wall 212b to make an angular motion.

The housing 211 is constituted by a bottom plate 211a, right and left side plates 211b, 211b' vertically provided on an upper face of the bottom plate 211a, and front and rear side plates 211c, 211c'. The housing is, as a whole, formed into a box-shape having an upper face which opens in its entirety to the outside. The length of each of the right and left side walls 211b, 211b' of the housing 211 is slightly longer than a cigarette length, and the front and rear side walls 211c, 211c' each have a length longer than the length of the right and left side walls.

The bottom plate 211a is formed with an opening through which an upper portion of the guide chute 220 extends. This opening is provided at a location shifted toward the left side plate 211b' with respect to the supply cylinder 213 and extends in parallel to the right and left side walls 211b, 211b', so that a cigarette 4 discharged from the supply cylinder 213 may fall into the guide chute 220 through the upper opening of the guide chute.

The hopper 212 is constituted by a plate-like inclined wall 212a, a plate-like movable wall 212b, and the front and rear side plates 211c, 211c' of the housing 211. Thus, the hopper 212 opens at the entire upper face to the outside, and has its depth slightly longer than the cigarette length. The hopper 212 cooperates with the outer peripheral face of an upper part of the supply cylinder 213 to define a cigarette reserving space, having a trapezoidal cross section, for reserving, e.g., thirty to forty cigarettes.

The inclined wall 212a of the hopper 212 is disposed within the housing 211 on a left upper side with respect to the supply cylinder 213, as viewed from the front. The inclined wall 212a is fixed at its left, front and rear end faces to the housing 211. Specifically, the left end face of the inclined wall 212a is in contact with the inner face of the left side plate 211b' of the housing 211 and the front and rear end faces of the inclined wall 212a are in contact with the inner faces of the side plates 211c, 211c' of the housing 211. Further, the inclined wall 212a extends obliquely to the right and downward from the inner face of an upper edge portion of the left side plate 211b' of the housing to the outer peripheral face of the supply cylinder 213. The right end face (lower edge) of the inclined wall 212a is disposed close to the outer peripheral face of the supply cylinder 213 at a slight distance.

The movable wall 212b is disposed in the housing 211 at a location on the right upper side with respect to the supply cylinder 213 as viewed from the front, and is pivotably mounted through mounting shafts 217 to the front and rear side plates 211c, 211c' of the housing 211. At the right end portion (upper edge portion) of the movable wall 212b, the mounting shafts 217 project outwardly from the front and rear end faces of the movable wall 212b, and distal end portions of these mounting shafts 217 are fitted into holes formed in the front and rear side plates 211c, 211c' of the housing. A stopper 214 is provided on the lower left side with respect to the mounting shafts 217. Normally, the movable wall 212b assumes a stationary position where the bottom face of the movable wall is in contact with the stopper 214. In the stationary position, the movable wall 212b extends obliquely to the left and downward from the inner face of the upper part of the right side plate 211b of the housing to the outer peripheral face of the supply cylinder 213. The right end face (upper end edge) of the movable wall 212b is disposed close to the inner face of the right side plate 211b with a slight gap, and the left end face (lower end edge) is disposed close to the outer peripheral face of the supply cylinder 213 with a slight gap.

The lower end edge of the inclined wall 212a and the lower end edge of the movable wall 212b are spaced at a distance corresponding to two or three cigarettes. These two lower end edges cooperate with the inner faces of the front and rear side plates 211c, 211c' to define a lower opening 212c of the hopper. Part of the outer peripheral face of the supply cylinder 213 facing the hopper lower opening 212c is fitted into and closes the lower opening 212c.

The supply cylinder 213 is disposed within the housing 211 at a location beneath the hopper 212, and is rotatably mounted through mounting shafts 219 to the front and rear side walls 211c, 211c' of the housing. The mounting shafts 219 project outwardly from the both the end faces of the supply cylinder 213, respectively. The distal end portions of the mounting shafts 217 are fitted into holes formed in the front and rear side plates 211c, 211c' of the housing. The supply cylinder 213 is drivingly coupled to an oscillating rotary motor 230 (FIG. 3), and is adapted to make a reciprocal rotary motion around the mounting shafts 219 between a cigarette receiving position where the supply cylinder receives a cigarette 4 discharged from the lower opening 212c of the hopper 212 and a cigarette delivering position where the supply cylinder discharges the cigarette 4 to the guide chute 220.

The supply cylinder 213 is formed at its outer peripheral face with a slot (cigarette receiving portion) 213a in the axial direction. The slot 213a extends over the entire length of the supply cylinder. The cigarette discharged from the hopper 212 is adapted to be received in the slot 213a when the supply cylinder 213 assumes the cigarette receiving position.

At a diametrically opposite position with respect to the slot 213a, the supply cylinder 213 is formed at the both end faces with recesses into which proximal portions of projections 215 are fitted. A distal end portion of each projection 215 projects radially outwardly of the supply cylinder 213 beyond the outer peripheral face of the supply cylinder, so as to be engaged with and disengaged from the bottom face of the movable wall 212b as the supply cylinder 213 makes a reciprocal rotary motion, to thereby cause the movable wall 212b to make an oscillatory movement. That is, the projections 215 of the supply cylinder 213 start to be engaged with the bottom face of the movable wall 212b when the supply cylinder 213 rotates up to a specific position short of the cigarette delivering position. The engagement between the projections 215 and the movable wall 212b is established while the supply cylinder 213 further rotates toward the cigarette delivering position, so that the movable wall 212b is moved upward. Then, the supply cylinder 213 rotates in an opposite direction from the cigarette delivering position, and the engagement between the projections 215 and the movable wall 212b is released when the supply cylinder rotates beyond an engagement releasing start position corresponding to the aforementioned engagement start position, so that the movable wall 212b assumes the stationary position.

The projections 215, the stopper 214, the oscillating rotary motor 230 and the like constitute a movable wall driving apparatus for causing the movable wall 212b to make a reciprocal angular motion.

A guide 216 which covers an upper left part of the outer peripheral face of the supply cylinder 213 is disposed to face the supply cylinder. The guide 216 serves to prevent the cigarette from dropping from the slot 213a of the supply cylinder 213 while the slot 213a moves circumferentially as the supply cylinder 213 makes a reciprocal rotary motion.

The supply cylinder 213 is formed at its outer peripheral face with a number of fine grooves 213b in the axial direction of the supply cylinder. The fine grooves 213b serve as a roughened face for increasing the degree of frictional engagement between the outer peripheral face of the supply cylinder 213 and cigarettes 4 falling within the hopper up to locations close to the lower opening 212c of the hopper, to thereby cause the cigarettes 4 to rotate. The depth and the width of each fine groove 213b are set to appropriate values so as to enhance the friction between the supply cylinder and the cigarettes 4. The roughened outer peripheral face of the supply cylinder 213 may be formed over at least that peripheral region which faces the lower opening 212c of the hopper when the slot 213a moves at a location in the vicinity of the cigarette receiving position.

To obtain the supply cylinder 213 having the roughened outer peripheral face, an aluminum rod is cut and the rod is subject to knurling to thereby form a number of fine grooves 213b (with a pitch of 0.5 mm and with a depth in the order of 0.3 mm).

Figure 5:
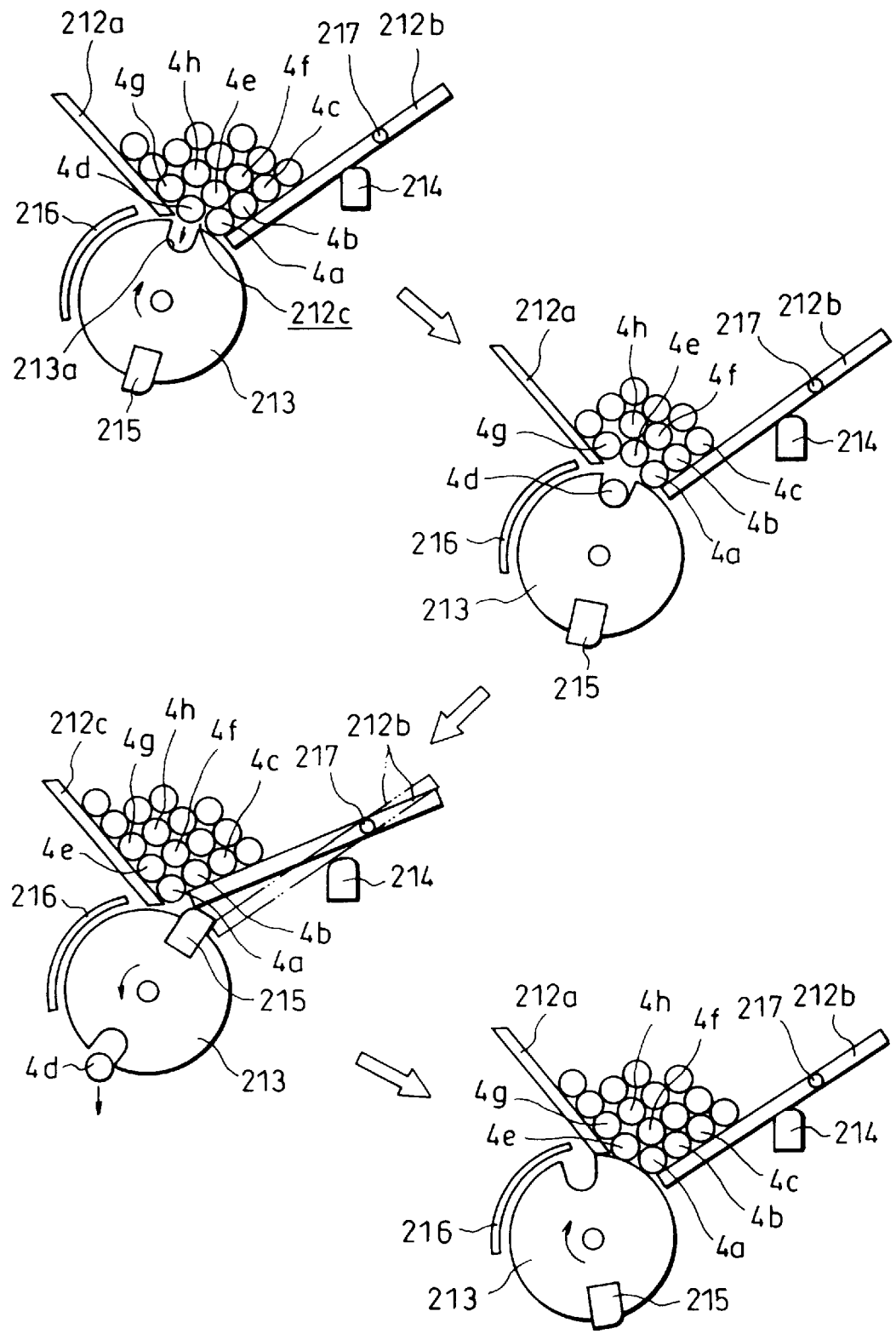
FIG. 5 is a view showing an operation of the cigarette supplying apparatus shown in FIG. 4.

With reference to FIG. 5, the operation of the cigarette supplying apparatus 200 will be explained below.

Under a condition that a number of cigarettes 4 (4a, 4b, - - - ) are reserved within the hopper 212, the supply cylinder 213 is rotated clockwise in FIG. 5 so that the slot 213a moves to reach the cigarette receiving position at which the slot 213a faces the lower opening 212c of the hopper, and one 4d of the cigarettes stored in the hopper is received in the slot 213a (see, upper left part of FIG. 5).

More detailed explanation as to how the cigarette 4d is received in the slot 213a will be given with reference to FIG. 6.

Figure 6:
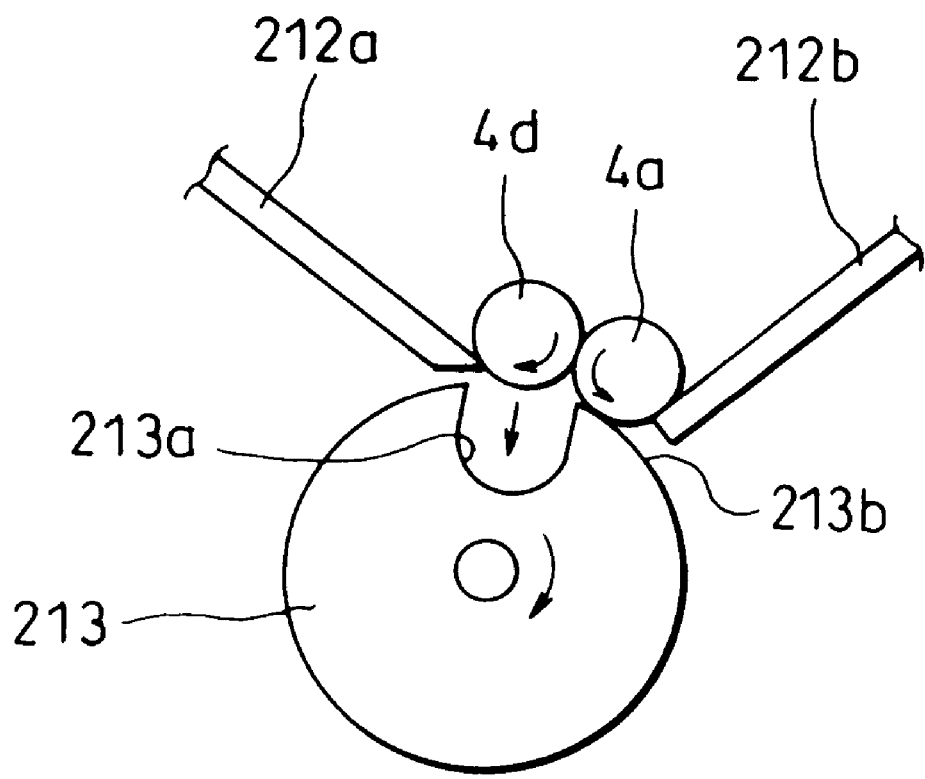
FIG. 6 is an enlarged view showing, in detail, movements of cigarettes to be received schematically shown in the left upper part of FIG. 5.

In FIG. 6, two cigarettes 4a and 4d face the lower opening 212c of the hopper. The cigarette 4a is strongly friction-engaged with the outer peripheral face of the supply cylinder formed with fine grooves 213b, and is applied with an anti-clockwise rotational force as the supply cylinder 213 rotates clockwise in FIG. 6, whereby the cigarette 4a attempts to make a rolling motion in the direction away from the slot 213a. On the other hand, the cigarette 4d is in sliding contact with the cigarette 4a and is applied with a clockwise rotational force from the cigarette 4a, whereby the cigarette 4d makes a rolling motion toward the slot 213a to be reliably received in the slot.

As explained in the above, at the time of a cigarette being received by the slot 213a, one of two cigarettes facing the slot 213a through the lower opening 212c of the hopper is applied with a rotational force which causes this cigarette to make a rolling motion in the direction away from the slot 213a, and another cigarette is applied with a rotational force which causes the just-mentioned cigarette to make a rolling motion toward the slot 213a. This facilitates the cigarette 4d to exhibit a self-aligning function by virtue of its own weight. As a result, the cigarette 4d is aligned in parallel to the slot 213a. Thus, a failure such that the cigarette is prevented from being received in the slot 213a does not occur.

When the cigarette 4d is received in the slot 213a, the space having been occupied by the cigarette 4d in the hopper 212 becomes empty, and neighboring cigarettes 4e, 4g and 4h move toward the empty space. Here, it is assumed that these cigarette motions produce resultant forces among these cigarettes 4a, 4e and 4g such as to form a shelf of cigarettes (see, upper right part of FIG. 5).

Under this condition or assumption, as the supply cylinder 213 rotates anti-clockwise from the cigarette receiving position, the cigarette 4d received in the slot 213 reaches the cigarette delivering position which is diametrically opposite in the supply cylinder with respect to the cigarette receiving position, while being prevented by the guide 216 from moving out of the slot 213a, and falls into the guide chute through the upper opening of the guide chute. The guide chute 220 comprises a direction-turnover guide 221 having an arcuate guide face for changing a cigarette 4 from a horizontal posture to a vertical posture, and a lower opening through which the cigarette 4 having the vertical posture is discharged. Preferably, the direction-turnover guide 221 is mounted to the main body of the guide chute 220 such that the mounting position is adjustable, whereby the horizontal width of the lower opening can be variably adjusted in accordance with the specification of the cigarette 4.

The cigarette 4 discharged from the guide chute 220 is introduced into a ventilation-characteristic measuring section 400 disposed below the cigarette supplying apparatus 200 (see, lower left part of FIG. 5).

When the supply cylinder 213 reaches a specific position short of the cigarette delivering position, the projections 215 of the supply cylinder are brought in contact with the lower face of the movable wall 212b. With a further rotation of the supply cylinder 213 toward the cigarette delivering position, the lower edge of the movable wall 212b is caused to move upward, so that the movable wall 212b is rotated clockwise around the mounting shafts 217. As a result, cigarettes 4 are vibrated to thereby destroy the shelf of the cigarettes 4a, 4e and 4g (see, the lower left part of FIG. 5). With the clockwise rotation of the movable wall 212b, the upper edge of the movable wall 212b moves downward, and hence a shelf of cigarettes, if any, formed at a location above the shafts 217 will be destroyed.

Next, as the supply cylinder 213 rotates clockwise from the cigarette delivering position, the movable wall 212b rotates, by virtue of its own weight, anti-clockwise around the shafts 217. When the movable wall 212b is brought in contact with the stopper 214, the projections 215 of the supply cylinder are out of contact with the movable wall 212b. In this manner, the movable wall 212b is rotated around the mounting shafts 217 as the supply cylinder 213 rotates clockwise, and thereafter, the movable wall is in contact with the stopper 214 and becomes stationary (see, lower right part of FIG. 5). Further, impacts and vibrations are given to cigarettes 4 when the movable wall 212b is brought in contact with the stopper 214. As a consequence, respective cigarettes 4 are reserved in the hopper 212 so as not to form a shelf of cigarettes.

As with the case of the cigarette 4d, the next cigarette 4e will be received in the slot 213a of the supply cylinder 213 (see, the upper left part of FIG. 5).

As explained in the above, the lower edge of the movable wall 212b is moved upward by the projections 215 of the movable-wall driving means and moves downward by virtue of its own weight. Thus, the entire movable wall 212b makes an oscillating motion in the vertical direction.

The oscillating motion of the movable wall 212b forming part of the hopper 212, effected with rotary motion of the supply cylinder 213, destroys a shelf of cigarettes, if any, within the hopper 212, so that cigarettes are orderly reserved in the hopper 212.

In the preferred embodiment explained above, the movable wall driving apparatus is comprised of the projections 215, the stopper 214, the oscillating rotary motor 230 and the like, so that a reciprocal rotary motion of the supply cylinder 213 is achieved by a reciprocal rotation of the output shaft of the oscillating rotary motor 230. However, the present invention is not limited thereto and driving means of different types may be employed if the reciprocal rotary motion of the movable wall 212b can be made with the rotation of the supply cylinder 213. For example, the supply cylinder 213 may be coupled, through a link mechanism or a cam, to the output shaft of a motor adapted to rotate in a fixed direction or a movable rod of an actuator adapted for reciprocal motion, whereby a rotational motion of the motor shaft or a reciprocal motion of the actuator rod may be converted into a reciprocal rotary motion of the supply cylinder 213. In this case, the movable wall 212b makes a reciprocal angular motion with a reciprocal rotary motion of the supply cylinder 213.

Although the supply cylinder 213 is designed to make a reciprocal rotary motion in the foregoing embodiment, the present invention is not limited thereto and the supply cylinder 213 may be rotated in a fixed direction. In order to cause a reciprocal angular motion of the movable wall 212b as the supply cylinder 213 makes an anti-clockwise rotation, an arrangement may be employed in which the movable wall 212b is provided at lower parts of its front and rear end faces with arms which project outwardly of the housing 211 so as to extend beyond the side plates 211c, 211c' of the housing 211, and the supply cylinder 213 is configured such that both the end faces thereof project beyond the side plates 211c, 211c', whereby the projections 215 provided on the periphery of the supply cylinder 213 are permitted to be engaged with and disengaged from the arms of the movable wall 212b, for instance.

Moreover, a compressed-air source, an ordinary electric motor or the like may be employed as a power source for rotation of the supply cylinder 213.

The present invention is not limited to an arrangement having a single movable wall. Instead of a fixed inclined wall 212a, the inclined wall may be constituted by a movable wall. This applies to the slot 213a and the movable wall driving apparatus. That is, a plurality of slots may be formed and a plurality of movable wall driving apparatuses may be employed.

Although a roughened face is constituted by a number of fine grooves 213b in the foregoing embodiment, the present invention is not limited thereto, and a roughened face may be constituted by coarse mesh, satin finish, small irregularities or the like so long as it can increase friction between the supply cylinder and cigarettes 4.

Ventilation-Characteristic Measuring Section

The ventilation vessel 401 of the ventilation-characteristic measuring section 400 comprises a plate 401a, an upper seal holder 401b, a flange 401c, a lower seal holder 401d, and a cup 401e. These ventilation vessel component parts are fabricated separately from one another, so that they can be assemble and disassembled. The plate 401a is formed into a rectangular shape as viewed from above, and has an upper face which is formed a central part with a shallow recess to which a bottom portion of the upper guide 420 is detachably fitted. The upper seal holder 401b, the flange 401e, the lower seal holder 401d and the cup 401e are each formed into a cylindrical shape and are air-tightly and detachably joined to one another. The cup 401e has two pairs of projecting pieces 401f projecting from an outer peripheral face of the cup.

Each of two fasteners 430 (FIG. 3) for fixedly fastening the ventilation vessel component parts 401a through 401e is comprised of a bolt 431 and a wing nut 432. The bolt 431 has a T-shaped end at which the bolt is pivotally engaged with an engagement hole formed in the projecting piece 401*f* of the cup 401*e* in such a manner that the bolt is not detached from the engagement hole. Upon assemblage of the ventilation vessel 401, another end portion, which is formed with threads, of the bolt 431 is inserted into a bolt groove formed in a corresponding one of end portions of the plate 401*a*, and the wing nut 432 threadedly attached to the threaded end portion is tightened. If, on the other hand, the engagement between the bolt 431 and the plate 401*a* is released by loosening the wing nut 432, the ventilation vessel component parts 401*a* through 401*d* can be detached from the cup 401*e* and can be disassembled for easy maintenance, inspection, and cleaning of the ventilation vessel. The whole of the ventilation vessel 401, the lower guide 440, the closing members 450 and the cylinders 451 is mounted to a frame of the cigarette quality testing apparatus so that a positional adjustment can be made to permit the ventilation vessel and the lower guide to be axially aligned with the lower opening of the guide chute 220 of the cigarette supply apparatus.

A test-piece supporting device 470 (FIG. 8) comprised of a test-piece holding member 472 and a ring 471 which holds the holding member is mounted to an inner peripheral face of each of the upper and lower seal holders 401*b* and 401*d*. These two test-piece holding members 472 cooperate with the ventilation vessel component parts 401*b* through 401*d* to define an upper airtight chamber 402*a*. The lower test-piece holding member 472 cooperates with the inner peripheral faces of the lower seal holder 401*d* and the cup 401*e* and the closed lower guide 440 to define a lower airtight chamber 402*b* (FIG. 7).

Figure 8:
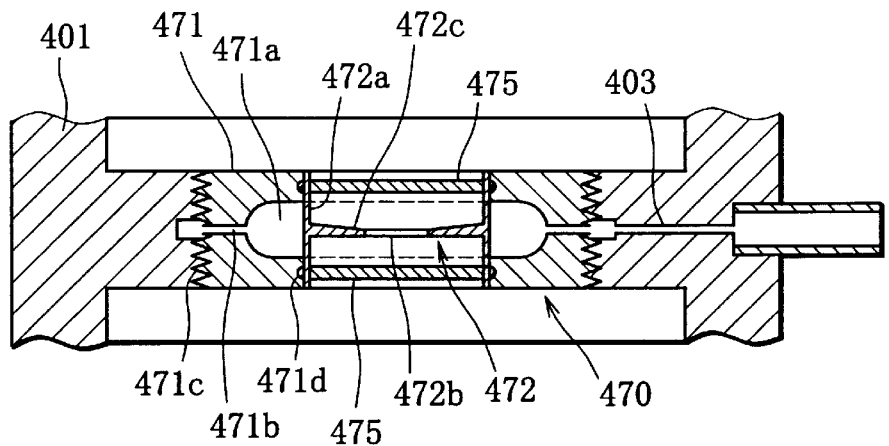
FIG. 8 is an enlarged sectional view of a test-piece supporting device shown in FIG. 7.

As shown in FIG. 8, the test-piece holding member 472 is obtained by forming silicon rubber into a thin flexible cylinder and has a tubular portion 472*a* and a partition wall 472*c* projecting radially inwardly from a central part of the tubular portion 472*a*, the partition wall 472*c* being formed at its central part with a test-piece supporting hole 472*b*. The tubular portion 472*a* has a length of 12 mm, for instance, which is the same as the thickness of the holding ring 471. The partition wall 472*c* is tapered as viewed in cross section and the thickness of the partition wall is thick in the order of 1.5 mm at a peripheral edge portion and is thin in the order of 0.25 mm at its central part. The test-piece supporting hole 472*b* has a diameter of 5 mm, for instance, which is slightly smaller than the diameter of the test piece 4.

The holding ring 471 has an outer peripheral face 471*c* which is formed with threads and an inner peripheral portion at which a suction chamber 471*a* is formed. Further, two annular grooves 471*d* are formed in the inner peripheral face of the ring at locations above and below the suction chamber 471*a*. When the ring 471 is threadedly mounted to the inner wall of the ventilation vessel 401, the suction chamber 471*a* is communicated with the outside of the ventilation vessel through a suction hole 471*b* of the ring 471 and a suction passage 403 of the ventilation vessel 401. By fitting O-rings 475 in the annular grooves 471*d*, the test-piece holding member 472 is in close contact with and is held by an inner wall of the holding ring 471.

In the test-piece supporting device 470, when the tubular portion 472*a* of the test-piece holding member 472 is sucked under negative pressure from the suction chamber 471*a* side, a central part, corresponding to the partition wall 472*c*, of the tubular portion 472*a* is pulled into the suction chamber 471*a*, so that the diameter of the test-piece supporting hole 472*b* expands up to about 12 mm, for instance. As a result, the test piece 4 is permitted to be inserted into the hole 472*b* from above. If the suction under negative pressure is stopped so that the suction chamber is filled with atmospheric pressure, the tubular portion 472*a* of the test-piece holding member 472 is restored. As a consequence, an inner peripheral edge of the partition wall 471*c* is brought in press-contact with an outer peripheral face of the test piece and is slightly curved, whereby the test piece is held and the airtight chambers 402*a* and 402*b* are defined. After the measurement in respect of the test piece is completed, a suction pressure is applied again to cause the test-piece supporting hole 472 to open, so that the test-piece is permitted to be discharged from the ventilation vessel.

As explained above, the test piece is supported by the thin inner peripheral edge of the partition wall. In other words, the test piece 4 is brought in substantially line-contact with or in face-contact at a small contact area with the holding member 472. Thus, only a small part of the outer peripheral face of the test piece is blocked by the holding member, so that the ventilation characteristic measurement can be done with high accuracy. Furthermore adequate sealing can be attained by the partition wall.

A stopper 405 disposed in the ventilation vessel is driven by a stopper drive cylinder 406 to move between an operating position beneath the test-piece holding member and a receding position laterally apart from beneath the test-piece holding member.

The ventilation vessel 401 is comprised of a lower guide member 440 made of a flexible material such as rubber, and a pair of closing members 450 disposed on both sides of a lower portion of the lower guide member 440. The closing members 450 are driven by the cylinders 451 to move between a receding position apart from the lower guide member 440 and an operating position at which the lower portion of the lower guide member 440 is clamped by the closing members.

In the ventilation-characteristic measuring section 400, as shown in FIG. 7, a vacuum pump 411 is connected to an input port of a three-way solenoid valve 415*a* through a pipe 417 in which a critical nozzle 412 and a mist filter 413 are provided. The vacuum pump 411 is communicated with suction passages 403 of upper and lower seal holders 401*b* and 401*d* through a pipe 418 branching from the pipe 417. A normally-closed solenoid valve 415*c* is provided in the pipe 418.

The solenoid valve 415*a* has two output ports. A first output port is connected, on one hand, with a first input port of another three-way solenoid valve 415*b* and is connected, on the other hand, with the lower airtight chamber 402*b* of the ventilation vessel through a pipe 417*a* and a passage formed in the cup 401*e* of the ventilation vessel. A second output port of the solenoid valve 415*a* is connected through a pipe 419 with a second input port of the solenoid valve 415*b* and with a flow meter 414. An output port of the solenoid valve 415*b* is communicated with the upper airtight chamber 402*a* through the pipe 417*a* and a passage formed in the flange 401*c* of the ventilation vessel.

The control section 700 carries out a ventilation characteristic measurement control in accordance with a control program stored in a memory of the control section. For instance, the three-way solenoid valves 415*a*, 415*b*, 415*c*, the stopper driving cylinder 406, the closing-member driving cylinder 451 and the like are turned on and off in accordance with control signals delivered from the control section 700. Under the control of the control section 700, the three-way solenoid valves 415*a* and 415*b* are turned on and off, so that a pipe arrangement is changed over as shown by solid lines in FIGS. 9, 10 and 11, whereby a measuring characteristic line of the flow meter 414 is calibrated before the ventilation characteristic measurement.

That is, when none of the three-way solenoid valves 415a and 415b is energized or when they are turned off, the input port of the solenoid valve 415a is communicated with the first output port of the same, whereas the first input port of the solenoid valve 415b is communicated with the output port of the same. As a result, the pipe arrangement shown by the solid line in FIG. 9 is established. More specifically, the upper and lower airtight chambers 402a and 402b of the ventilation vessel are connected with the vacuum pump 411 through the pipes 417a, 417 and the pipes 417b, 417, respectively. The upper and lower airtight chambers 402a and 402b are evacuated by the vacuum pump 411, so that a stream of air flows through the pipe 417 at a predetermined rate, e.g., 17.5 cc per second under the action of the critical nozzle 412. On the other hand, the connection through the pipe 419 between the flow meter 414 and the vacuum pump 411 is disconnected, and hence no stream of air flows through the flow meter 414 so that the flow rate reduces to zero. At this time, the flow meter 414 generates an output voltage e1 corresponding to the flow rate of zero. The control section 700 reads the output value e1 of the flow meter 414, and compares the output value e1 with a prescribed value to determine whether the output value e1 falls within a predetermined range. If the output value e1 falls outside the predetermined range, an abnormality of the flow meter is displayed.

If only the three-way solenoid valve 415a is tuned on, as shown in FIG. 10, the connection through the pipes 417a, 417b and 417 between the airtight chambers 402a, 402b and the vacuum pump 411 is disturbed, whereas the flow meter 414 is communicated with the vacuum pump 411 through the pipes 419 and 417. As a result, under the action of the critical nozzle 412, a stream of air flows through the flow meter 414 at the full rate of 17.5 cc per second, so that the flow meter 414 generates an output voltage e2 corresponding to the flow rate of 17.5 cc per second. The control section 700 reads the output value e2 of the flow meter 414, and compares the output value e2 with a prescribed value to determine whether or not the output value e2 falls within a predetermined range. If the output value e2 falls outside the predetermined range, an abnormality of the flow meter is displayed on an operation/display panel 800.

In this manner, a measuring characteristic line showing a relationship between output voltage e and flow rate X is determined on the basis of the output voltage e1 obtained when the flow rate of air flowing though the flow meter 414 reduces to zero and the output voltage e2 obtained when the flow rate becomes equal to 17.5 cc per second.

For the ventilation characteristic measurement, a cigarette 4, as a test piece, is set in the upper and lower airtight chambers 402a and 402b of the ventilation vessel 401.

A cigarette is set in the ventilation vessel 401 as follows: When determining that no test piece 4 is present in the ventilation vessel 401 on the basis of an output from a test-piece detection sensor, not shown, the control section 700 drives the cylinder 406 to move the stopper 405 to the test-piece supporting position and drives two cylinders 451 to cause a pair of closing members 450 to firmly hold the flexible lower guide 440 from both sides of the lower guide, to thereby prevent the connection between the lower guide 440 and the atmosphere. Further, under the control of the control section 700, the solenoid valve 415c is turned on, so that the suction chambers 471 of the upper and lower test-piece supporting devices 470 are communicated with the vacuum pump 411 through the pipes 418 and 417. Then, the suction chambers are evacuated by the vacuum pump, to thereby enlarge the diameter of the test-piece supporting holes 472b of the test-piece holding members 472. Under this condition, a cigarette 4 supplied from the cigarette supply apparatus 200 passes through the test-piece supporting holes 472b and is held by the test-piece stopper 405.

When the solenoid valve 415c is turned off by the control section 700 in response to a detection signal supplied from the test-piece detecting sensor and indicating that a cigarette 4 is supplied to the ventilation vessel 401, the suction chambers 471a are filled with atmospheric pressure. As a result, the diameters of the test-piece supporting holes 472b decrease, so that the cigarette 4 is held in the supporting holes, and two airtight chambers 402a and 402b of the ventilation vessel 401 are hermetically sealed. Then, the test-piece stopper 405 is driven to the receding position.

After the cigarette 4 is set in the ventilation vessel 401 in the above manner, only the solenoid valve 415b is turned on in order to start the ventilation characteristic measurement. As a consequence, the pipe arrangement is established as shown in FIG. 11, which extends from the flow meter 414 to the vacuum pump 411 through solenoid valve 415b, upper airtight chamber 402a, test piece 4, lower airtight chamber 402b, solenoid valve 415a and critical nozzle 412.

Under this condition, air passing through the flow meter 414 flows through the solenoid valve 415b via the pipe 419, enters into the upper airtight chamber 402a via the pipe 417a, and enters into the test piece 4 through the peripheral face and the upper end face of the cigarette portion of the test piece 4. The air entering into the test piece 4 flows out of the test piece through the peripheral face of a lower end portion of the filter of the test piece 4 and through the lower end face of the filter. The flow rate of air flowing through the critical nozzle 412 is kept constant at 17.5 cc per second. Thus, in association with this standard flow rate, a flow rate at which air enters into the test piece through a lateral part thereof can be measured based on an output of the flow meter 414.

As shown in FIG. 12, the flow meter 414 is of a thermal type having a pipe 414a through which gas (air) serving as an object of measurement flows, two resistors 414b and 414c wound around the pipe 414a and covered by a heat insulator, and a bridge circuit 414d including the resistors 414b and 414c and operable to generate an output voltage e as a measurement value. The flow meter 414 of this type has an adequate linearity between flow rate and output voltage, so that a measuring characteristic line can be determined as a calibration line shown in FIG. 13. Thus, by solving the following equations (1) and (2) with use of the known output voltages e1 and e2, coefficients α and β are determined, and further the calibration line representing a relationship between output voltage e and flow rate X is determined in accordance with the following equation (3).

$$17.5 = \alpha \times e2 + \beta \quad (1)$$

$$0 = \alpha \times e1 + \beta \quad (2)$$

$$X = \alpha \times e + \beta \quad (3)$$

After the measurement is completed, under the control of the control section 700, the cylinders 451 are actuated to move the closing members 450 to the receding positions, and the solenoid valve 415c is turned on whereby the suction chambers 471a of the test-piece supporting devices 470 are evacuated to increase the diameter of the test-piece supporting holes 472b so as to permit the test piece 4 to be released and discharged from the ventilation vessel 401.

Circumference Measuring Section

As already explained in the above, the circumference measuring section 600 has a cylindrical holder 610 made of a flexible material. In a condition that a cigarette is loosely inserted into a hollow portion of the holder 610, pressurized air is supplied in between the opposite peripheral faces of the holder 610 and a sleeve 620 to decrease the diameter of the holder 610 to thereby hold the cigarette 4 in a vertical position in the holder 610. Then, as the cigarette 4 is rotated through a predetermined angle, e.g., 180 degrees, together with the holder 610 and the sleeve 620, the cigarette diameter is detected plural times, e.g., 60 times, with use of a photosensor 661, 662. Based on an average value of the detected cigarette diameter values, the circumference of the cigarette is measured.

Although more detailed explanations in respect of the construction and operation of the circumference measuring section 600 is omitted, it is advisable to form an annular groove along the inner peripheral face of the sleeve, for instance, in order to uniformalize pressurized air supplied through a pressurized-air supply port formed in the peripheral wall of the sleeve 620 and then supplied between the opposite peripheral faces of the holder 610 and the sleeve 620 to thereby appropriately hold a cigarette 4 by the holder 610. This makes it possible to supply the pressurized air, entering the air supply port of the sleeve 620, along the annular groove, so that the pressurized air is uniformly supplied between the opposite peripheral faces of the holder 610 and the sleeve 620.

Upon calibration of a cigarette diameter vs. output voltage characteristic of the photosensor 661, 662, a guide member 630 and a guide support plate 631 to which the guide member 630 is fixed are detached from a guide support rod 632 by loosening a screw which fixes the support plate 631 to the support rod 632. Next, a standard gauge having a known diameter is inserted into the hollow portion of the holder 610, and the diameter of the standard gauge is measured. More specifically, the diameter measurement is carried out by rotating the standard gauge together with the holder 610 and the sleeve 620, in a condition that the standard gauge is held by the holder by supplying a pressurized air between the holder and the sleeve. Whereupon, a required calibration is made based on a result of measurement and the known diameter.

The rod-shaped article supplying apparatus of the present invention is not limited to the foregoing embodiment, but may be modified variously.

For instance, although the case where the present invention is applied to a cigarette supply apparatus has been described in the embodiment, the present invention is applicable to an apparatus for supplying rod-shaped articles other than cigarettes.

In the embodiment, a cigarette quality testing apparatus in which a cigarette supply apparatus is used in combination with a ventilation-characteristic measuring section and a circumference measuring section. However, the present invention is applicable to a cigarette quality testing apparatus other than the above-described embodiment. For instance, the present invention is applicable to a testing apparatus which comprises a weight measuring section or a length measuring section instead of or in combination with the ventilation-characteristic measuring section or the circumference measuring section. Furthermore, constructions of the ventilation-characteristic measuring section or the circumference measuring section are not limited to those described in the embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rod-shaped article supplying apparatus comprising:

a hopper for reserving rod-shaped articles and for permitting the rod-shaped articles to be discharged through a lower opening of the hopper;

a supply cylinder having an outer peripheral face with a receiving portion for receiving a rod-shaped article, said supply cylinder being rotatable so that the receiving portion moves along a moving path including a rod-shaped article receiving position where the receiving portion faces the lower opening of the hopper and a rod-shaped article delivering position where the rod-shaped article is discharged from the receiving portion;

said rod-shaped article supplying apparatus includes at least one movable wall constituting a part of the hopper and arranged for angular motion, and a driving apparatus for causing said at least one movable wall to make the angular motion;

the hopper has a first plate extending obliquely toward the supply cylinder and constituting said at least one movable wall, said first plate is pivotably supported at an upper end portion thereof and has a lower edge extending in parallel to a rotation axis of the supply cylinder and disposed close to the outer peripheral face of the supply cylinder to constitute one side edge of the lower opening of the hopper; and said driving apparatus includes a driving system for causing the supply cylinder to make a reciprocal rotation such that the receiving portion of the supply cylinder makes a reciprocal rotational movement between the rod-shaped article receiving position and the rod-shaped article delivering position, a projection projecting radially outwardly from the outer peripheral face of the supply cylinder, the projection being provided at a location diametrically opposite the receiving portion and permitted to be engaged with and disengaged from a lower face of a lower edge portion of the first plate, and a stopper adapted to abut against the lower face of the first plate to thereby hold the first plate when the projection is out of engagement with the first plate.

2. The rod-shaped article supplying apparatus according to claim 1, wherein the hopper has a second plate extending obliquely toward the supply cylinder, and the second plate has a lower edge extending in parallel to the rotation axis of the supply cylinder and disposed close to the outer peripheral face of the supply cylinder to constitute another side edge of the lower opening of the hopper.

3. The rod-shaped article supplying apparatus according to claim 2, wherein the hopper has a third and a fourth plate extending perpendicularly to the rotation axis of the supply cylinder, and disposed at a distance from each other, the distance between the third and fourth plates being longer than lengths of the rod-shaped articles.

4. The rod-shaped article supplying apparatus according to claim 3, wherein the second plate is fixed to the third and fourth plates.

5. The rod-shaped article supplying apparatus according to claim 1, further comprising:

a guide chute, disposed below the supply cylinder, for receiving the rod-shaped articles discharged from the receiving portion of the supply cylinder, wherein said guide chute has an upper opening thereof disposed to face the receiving portion of the supply cylinder when the receiving portion moves to the rod-shaped article delivering position, a direction-turnover guide for changing a posture of the rod-shaped articles, entering the guide chute through the upper opening, from a horizontal posture to a vertical posture, and a lower opening through which the rod-shaped article having the vertical posture is discharged.

6. The rod-shaped article supplying apparatus according to claim 5, wherein the hopper has a second plate extending obliquely toward the supply cylinder, and the second plate has a lower edge extending in parallel to the rotation axis of the supply cylinder and disposed close to the outer peripheral face of the supply cylinder to constitute another side edge of the lower opening of the hopper.

7. The rod-shaped article supplying apparatus according to claim 1, wherein the outer peripheral face of the supply cylinder is formed into a roughened face which increases a degree of frictional engagement between the outer peripheral face and the rod-shaped articles.

8. The rod-shaped article supply apparatus according to claim 7, wherein a number of fine grooves extending in parallel to the rotation axis of the supply cylinder are formed in the outer peripheral face of the supply cylinder, and the supply cylinder is disposed such that part of the outer peripheral face is loosely fitted into the lower opening of the hopper.

* * * * *